US010015998B2

United States Patent
Hong

(10) Patent No.: US 10,015,998 B2
(45) Date of Patent: Jul. 10, 2018

(54) SOCKS WITH BAND PORTION ONLY CONSISTING OF COVERING YARN AND WITH STRONG COUPLING BETWEEN BAND AND LEG PORTIONS

(71) Applicant: Jaehyung Hong, Yangsan-si (KR)

(72) Inventor: Jaehyung Hong, Yangsan-si (KR)

(*) Notice: Subject to any disclaimer, the term of this patent is extended or adjusted under 35 U.S.C. 154(b) by 224 days.

(21) Appl. No.: 15/036,642

(22) PCT Filed: Feb. 12, 2016

(86) PCT No.: PCT/KR2016/001450
§ 371 (c)(1),
(2) Date: May 13, 2016

(87) PCT Pub. No.: WO2016/159508
PCT Pub. Date: Oct. 6, 2016

(65) Prior Publication Data
US 2017/0099882 A1 Apr. 13, 2017

(30) Foreign Application Priority Data
Mar. 30, 2015 (KR) .......... 10-2015-0043949

(51) Int. Cl.
*A41B 11/00* (2006.01)
*A41B 11/04* (2006.01)
*A41B 11/12* (2006.01)

(52) U.S. Cl.
CPC .............. *A41B 11/04* (2013.01); *A41B 11/12* (2013.01); *A41B 2500/10* (2013.01)

(58) Field of Classification Search
CPC ......... A41B 11/12; A41B 11/02; A41B 17/00; D04B 9/54
See application file for complete search history.

(56) References Cited

U.S. PATENT DOCUMENTS

| 2,466,885 A * | 4/1949 | Floyd ................... A41B 11/12 66/107 |
| 3,122,906 A * | 3/1964 | Crawford ............... A41B 11/12 2/240 |
| 2009/0276939 A1* | 11/2009 | Sho ........................ A41B 11/02 2/239 |

(Continued)

FOREIGN PATENT DOCUMENTS

| KR | 1987-0005605 A | 7/1987 |
| KR | 20-1998-061891 U | 11/1998 |

(Continued)

*Primary Examiner* — Tejash Patel
(74) *Attorney, Agent, or Firm* — KORUS Patent, LLC; Seong Il Jeong

(57) ABSTRACT

The present disclosure provides a sock comprising a leg portion, and an elastic band portion coupled to the leg portion, wherein the band portion is knitted using only a covering yarn, wherein a bottom of the band portion is coupled in an integrated manner to a top of the leg portion via knitting, wherein the band portion has inner and outer portions, wherein the band and leg portions are knitted with each other such that each of first loops of outer and inner yarns of the leg portion passes through and hooks on both of first and last loops of the band portion, and, thereafter, the covering yarn is cut, and, then, the leg portion is continuously knitted using the outer and inner yarns thereof.

6 Claims, 6 Drawing Sheets

(56) References Cited

U.S. PATENT DOCUMENTS

2012/0180195 A1* 7/2012 Shull .................... A41B 11/003
2/239
2016/0278439 A1* 9/2016 Thorp .................. A41B 11/001

FOREIGN PATENT DOCUMENTS

| KR | 10-2005-0008561 A | 1/2005 |
| --- | --- | --- |
| KR | 10-2007-0044849 A | 5/2007 |
| KR | 10-1458883 B1 | 11/2014 |

* cited by examiner ic Disclosure

SOCKS WITH BAND PORTION ONLY CONSISTING OF COVERING YARN AND WITH STRONG COUPLING BETWEEN BAND AND LEG PORTIONS

CROSS-REFERENCE TO RELATED APPLICATION

This application claims the benefit of Korean patent application no. 10-2015-0043949, filed on Mar. 30, 2015, the entire content of which is incorporated herein by reference for all purposes as if fully set forth herein.

BACKGROUND

Field of the Present Disclosure

The present disclosure relates to a sock with a band portion only consisting of a covering yarn. More particularly, the present disclosure relates to a sock with a band portion only consisting of a covering yarn, wherein a bottom of the knitted band portion is coupled in an integrated manner to a top of a leg portion via knitting, to allow the band portion to have improved elasticity, to generate a firm connection between the band portion and leg portion, to reduce the number of the sock production steps to improve the yield thereof, and to save a yarn material cost.

The socks may function to warm the foot and absorb sweats from the foot. The socks may be always worn except for a sleep time. Thus, the socks wearing feel and functions may be important.

The conventional sock may include a cylindrical body wrapping a foot and ankle, and a band portion coupled to the cylindrical body with elasticity. The cylindrical body may have a leg portion wrapping the ankle or leg, an instep portion covering the instep, a toe portion with a plain form, a sole portion and heel portion. The leg portion and instep portion may have a specific pattern. The conventional manufacturing process of the sock may include knitting the cylindrical body from the band portion to the toe portion, and closing an open toe portion.

Before the present disclosure, the present inventor has produced a sock 100 as shown as shown FIG. 1 to FIG. 3. This sock 100 may include a cylindrical body including a leg portion 110, instep portion 120, sole portion 130, toe portion 140, and heel portion 150, and a band portion 160. The band portion 160 may have an outer portion 161 and inner portion 162. The band portion 160 may be formed by knitting spandex yarns and outer yarns, and then folding inwardly the knitted fabric such that the inwardly folded portion is shorter than the outer portion. The outer portion may act as the outer portion 161. The shorter inwardly folded portion may act as an upper portion 162-1 of the inner portion 162. The shorter inwardly folded portion 162-1 may be folded in an integrated manner from the outer portion 161.

The outer portion 161 may have a bottom portion coupled in an integrated manner to the leg portion 110 via knitting. The shorter inwardly folded portion 162-1 extending in an integrated manner from the outer portion 161 and made of knitting between the spandex yarn and outer yarn may be coupled to an inner band portion 162-2 made of knitted rubber yarns, which may be coupled to an upper portion of the leg portion 110 via a welting 162-3. In this connection, the leg portion 110 may be made of knitting between an outer yarn and inner yarn.

Korean patent number 10-1458883 titled as "COTTON SOCKS AND MANUTACTUIRING METHOD THEREOF" published on Nov. 7, 2014 relates to cotton socks manufactured by using a cotton covered yarn twisting a cotton yarn and a rubber yarn as an inner yarn of the socks and using a cotton yarn as an outer yarn of the socks and knitting, wherein a band part formed by being knitted to be integrally extended from the upper end of a wrist part of the cotton socks has two layer of an outer part and an inner part, and two to four rubber yarns are formed on the upper part of the outer part and two to four rubber yarns are formed on the lower part of the inner part based on the height of the band part to minimize stimulation on the skin of the feet caused by contact with cotton and to not slip down while minimizing a pressure applied to the calves when a user wears the socks.

For the above described conventional socks, the leg portion may extend in an integrated manner from the band portion on a top plate of the knitting machine via the welting, leading to a poor connection between the band portion and leg portion.

Further, for the conventional socks, the inner portion of the band portion may be only partially made of a rubber yarn, or the inner portion and outer portion may be only partially made of a rubber yarn. This may lead to a poor elasticity of the band portion.

Furthermore, for the conventional socks, due to the poor elasticity of the band portion, the leg portion may collapse toward the heel.

Furthermore, for the conventional socks, the band portion may have a single rubber yarn layer. When the sock is worn for a long time or is washed, the band portion may lose the elasticity.

Furthermore, for the conventional socks, the inner portion of the band portion is knitted and is moved to a top plate of the knitting machine having a special needle, and is loaded on the top plate, and, thereafter, knitting operation of the outer portion is completed. Then, in order to hide the inner side of the leg portion, the special needle and rubber yarn are coupled to each other, and, then, the band portion and leg portion are coupled to each other via the welting. This may lead to a complicated sock production process, and, thus, a lowered yield.

Furthermore, for the conventional socks, in order to form the band portion, all of a covering yarn (cotton covering yarn), spandex yarn (rubber yarn), and outer yarn (cotton fiber yarn) should be employed. Further, when any one of the covering yarn (cotton covering yarn), spandex yarn (rubber yarn), and outer yarn (cotton fiber yarn) is cut, an entire sock production process may stop.

Furthermore, for the conventional socks, after completion of knitting of the band portion using yarn guides for a cylindrical portion, that is, a covering yarn guide, spandex yarn guide (rubber yarn guide), and outer yarn guide (cotton fiber yarn guide), the band portion should be loaded on the top plate of the knitting machine.

This "Background" section is provided for background information only. The statements in this "Background" section are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY

From considerations of the above situations, the present disclosure provides a sock with a band portion only consisting of a covering yarn, wherein the body portion includes inner and outer portions, and a bottom of the knitted band portion is coupled in an integrated manner to a top of a leg portion via knitting, and wherein when a covering yarn loop hooks on a knitting needle in a cylinder, knitting operations proceed continuously to form the band portion, to eliminate a need of loading the band portion on the top plate of the knitting machine, to allow the band portion to have improved elasticity, to generate a firm connection between the band portion and leg portion, to reduce the number of the sock production steps to improve the yield thereof, and to save a yarn material cost.

One aspect of the present disclosure provides a sock comprising a leg portion, heel portion, instep portion, sole portion, toe portion, and, an elastic band portion coupled to the leg portion, wherein a combination of the leg portion, heel portion, instep portion, sole portion, and toe portion forms a knitted structure, wherein the band portion is knitted using only a covering yarn, wherein a bottom of the band portion is coupled in an integrated manner to a top of the leg portion via knitting, wherein the band portion has inner and outer portions which are formed by folding a single ring-type knitted structure made only of the covering yarn, wherein the band and leg portions are knitted with each other such that each of first loops of outer and inner yarns of the leg portion passes through and hooks on both of first and last loops of the band portion, and, thereafter, the covering yarn is cut, and, then, the leg portion is continuously knitted using the outer and inner yarns thereof.

One aspect of the present disclosure provides a sock comprising a leg portion, heel portion, instep portion, sole portion, toe portion, and, an elastic band portion coupled to the leg portion, wherein a combination of the leg portion, heel portion, instep portion, sole portion, and toe portion forms a knitted structure, wherein the band portion is knitted using only a covering yarn, wherein a bottom of the band portion is coupled in an integrated manner to a top of the leg portion via knitting, wherein the band portion has inner and outer portions which are formed by folding a single ring-type knitted structure made only of the covering yarn, wherein the band and leg portions are knitted with each other such that a first loop of an outer yarn of the leg portion passes through and hooks on a first loop of the band portion, and, at the same time, a first loop of an inner yarn of the leg portion passes through and hooks on a last loop of the band portion, and, thereafter, the covering yarn is cut, and, then, the leg portion is continuously knitted using the outer and inner yarns thereof.

In one embodiment, the covering yarn of the band portion includes a rubber yarn as a core yarn, and a twisted outer yarn twisted on and along an outer face of the core yarn, wherein the twisted outer yarn includes one selected from a group consisting of a spandex yarn, polyester yarn, nylon yarn, acrylic yarn, rayon yarn, polypropylene yarn, polyester yarn, polyethylene yarn, polyvinyl alcohol yarn, polyvinyl chloride yarn, polyvinylidene chloride yarn, and aramid yarn.

In one embodiment, the inner and outer portions of the band portion are knitted identically or differently.

The present disclosure provides follow effects:

The band portion is made of the double layers, all layers being made only of the covering yarn. This may lead to an elasticity of the band portion more improved by 50% than that of the conventional sock.

Further, the improved elasticity of the band portion may disallow the sock in a worn state to collapse toward the heel.

Furthermore, the band portion and leg portion may be coupled in an integrated manner to each other via knitting. This may lead to a firm connection between the band portion and leg portion.

Furthermore, the band portion is made of the double layers, all layers being made only of the covering yarn. The band portion may not lose the elasticity in spite of a long wearing duration or multiple washing.

Moreover, during the production of the sock, while the band portion is not loaded on the top plate of the knitting machine, the band portion and leg portion may be coupled in an integrated manner to each other via knitting. Thus, the number of the sock production steps may be reduced compared to the conventional sock production steps. This may more improve a yield of the sock by 10% than that in the conventional sock production process.

Furthermore, the band portion may be made only of the covering yarn without outer yarn and inner yarns. The band portion production cost may be reduced. Further, the sock production process may be less interrupted by 33% to 50% than in the conventional sock production process.

Furthermore, the band portion may be knitted only using the covering yarn guide. Then, when the knitted loop hooks on the knitting needle, the further knitting operation may be continuously carried out. It may dispense with the loading of the band portion on the top plate of the knitting machine.

DETAILED DESCRIPTIONS

Figure 1:
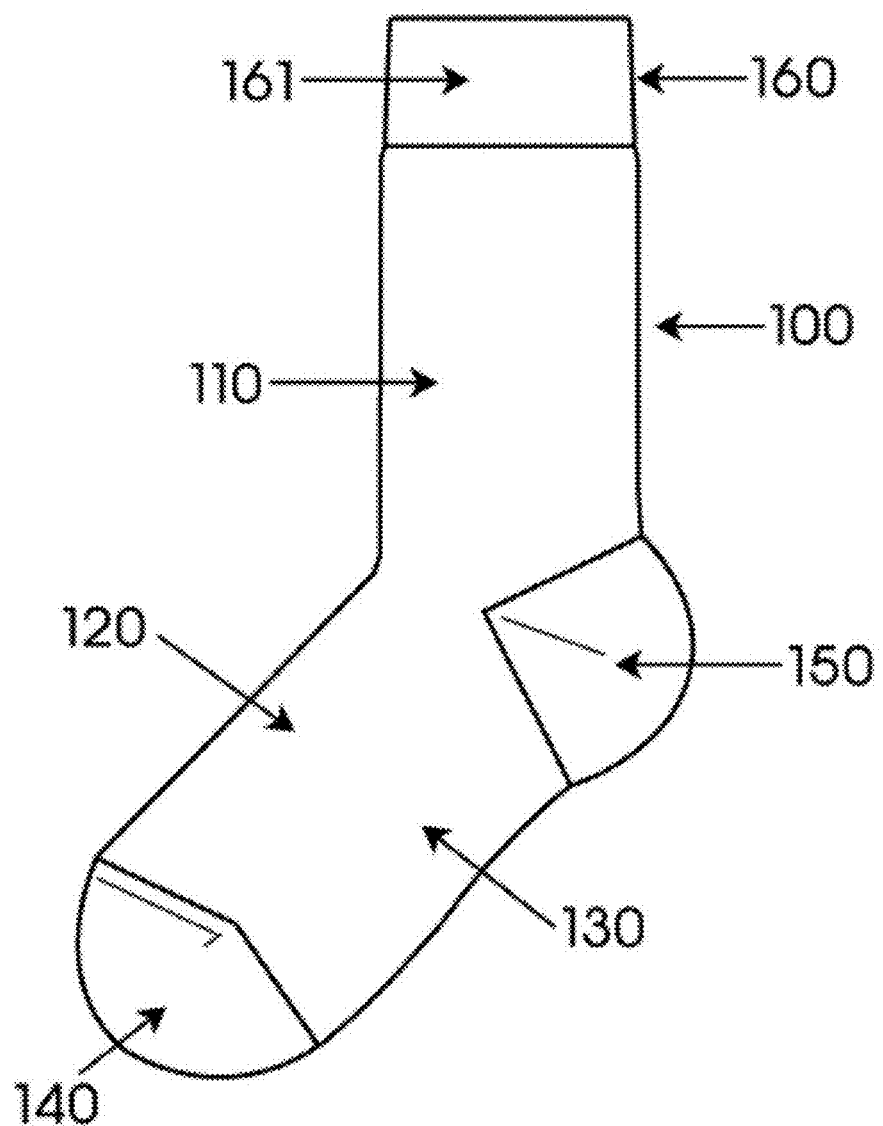
FIG. 1 shows a previous sock produced by the present inventor.
Figure 2:
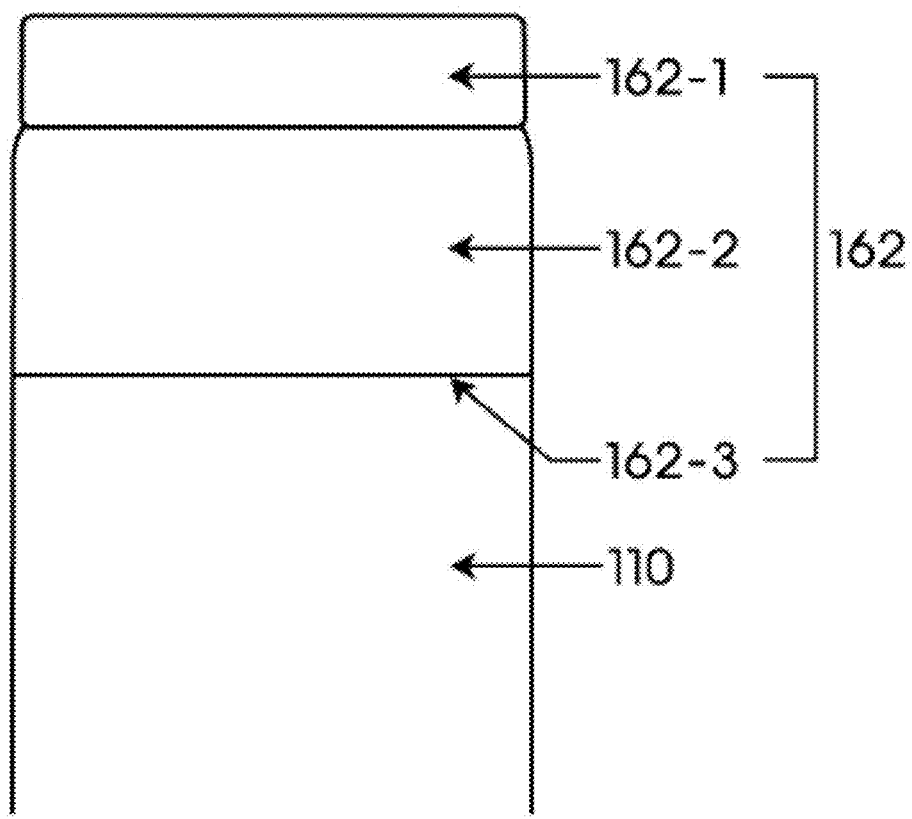
FIG. 2 shows an enlarged view of an inner side of the band portion of previous sock produced by the present inventor.

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Hereinafter, various embodiments of the present disclosure will be described in details with reference to attached drawings.

A sock 200 in accordance with the present disclosure may include a band portion 260 with elasticity, and a cylindrical body receiving an ankle, foot, partial leg. The cylindrical body may include a leg portion 210 (or an ankle portion when the sock is short not to surround the leg) having a pattern with a specific shape or stereoscopic decoration, an instep portion 220 covering the instep with a specific shape or stereoscopic decoration, a toe portion 240 with a plain form (not being branched) and without a specific shape or stereoscopic decoration, and a sole portion 230 and a heel portion 250. The present manufacturing process of the sock may include knitting the cylindrical body from the band portion 260 to the toe portion 240, and closing an open toe portion 240.

The pattern may refer to a repetition of a certain shape or style. The decoration may refer to a compact planar woven portion, and may include a specific geometrical decoration. The stereoscopic decoration may include an embossing structure. The stereoscopic decoration may be formed to be convex or concave using a heat or pressure or weaving process on a fabric face. The stereoscopic decoration may include a flower shape. For a sport sock, an inner yarn may be compacted in a perpendicular manner onto a single layer to form the stereoscopic decoration. The stereoscopic decoration may be formed of a pattern such as a rib, links or jacquard using a weaving machine.

The sole portion 230, heel portion 250 and toe portion 240 may contact a floor or shoe. In order to extend a life of the sock and function to absorb sweats and improve an appearance view, the sole portion 230, heel portion 250 and toe portion 240 may be knitted more compactly than the leg portion 210 or instep portion 220.

For the sock 200 in accordance with the present disclosure, the cylindrical body including the leg portion 210, heel portion 250, instep portion 220, sole portion 230 and toe portion 240 may be formed via knitting between the inner yarn and outer yarn as in the conventional sock. The cylindrical body may be formed using a dedicated knitting machine having a cylinder 50 having multiple needles configured to move upwards or downwards, wherein the cylinder 50 may rotate in a forward direction or reverse direction. The knitting machine may form, first, the open band portion 260, leg portion 210, heel portion 250, instep portion 220 and sole portion 230, and toe portion 240 in this order. The cylinder 50 may rotate in a forward direction until a boundary between the leg portion 210 and heel portion 250 is formed.

When the inner yarn and outer yarn are knitted, the inner yarn may be knitted as an inner portion of the cylindrical body, and the outer yarn may be knitted as an outer portion of the cylindrical body. The inner yarn and outer yarn may not be limited particularly in a material thereof as long as they may be knitted to form the sock 200.

The inner yarn may be knitted as an inner portion of the leg portion 210, heel portion 250, instep portion 220, sole portion 230 and toe portion 240 to contact a skin. The outer yarn may be knitted as an outer portion of the leg portion 210, heel portion 250, instep portion 220, sole portion 230 and toe portion 240 to be exposed outwardly. The outer portion of the heel portion 250, instep portion 220 and toe portion 240 may contact an inner face of a shoe. The sole portion 230 may contact an inner bottom of a shoe or a room floor.

In order to form the sock 200 in accordance with the present disclosure, the inner yarn and outer yarn may be fed to needles disposed in the cylinder 50 of the knitting machine, the outer yarn may be knitted as an outer portion of the sock 200, and the inner yarn may be knitted as an inner portion of the sock 200. In this way, the leg portion 210, heel portion 250, instep portion 220, sole portion 230 and toe portion 240 may be formed via the knitting of the inner and outer yarns.

Figure 3:
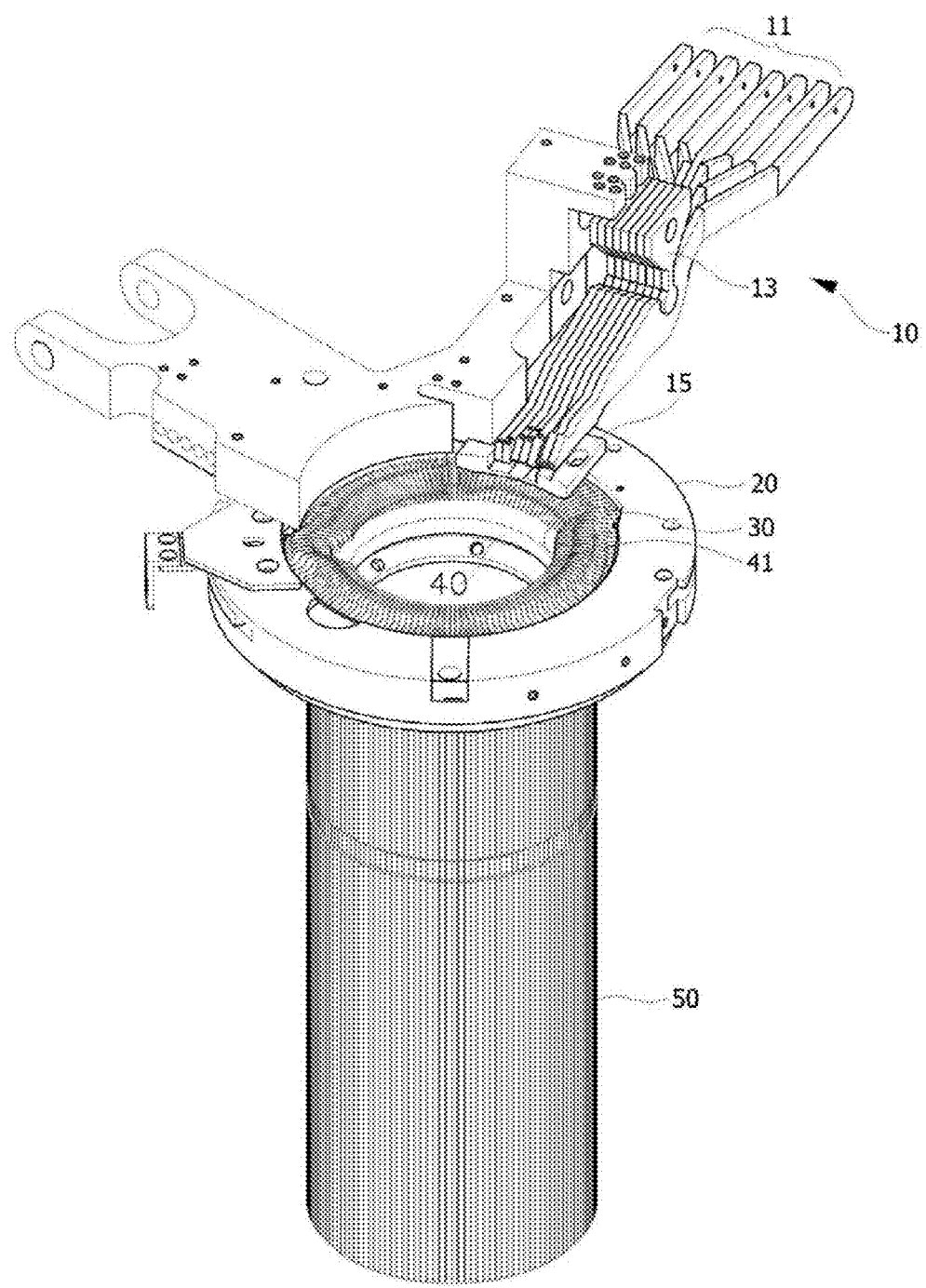
FIG. 3 shows a perspective view of a general sock knitting machine.
Figure 4:
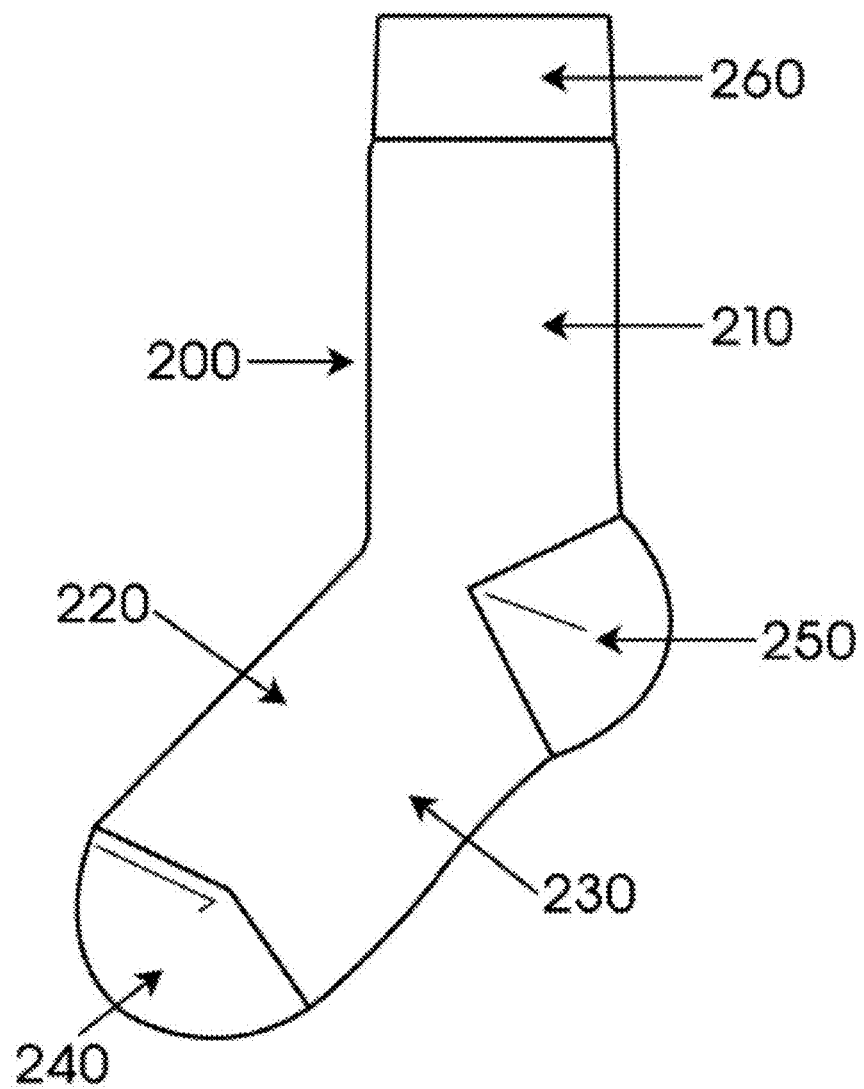
FIG. 4 shows a sock in accordance with the present disclosure.
Figure 5:
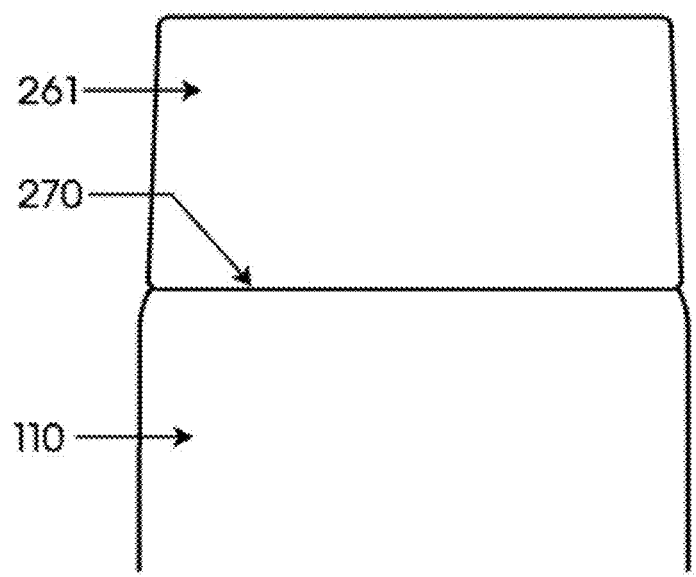
FIG. 5 shows an enlarged view of an outer side of a band portion of a sock in accordance with the present disclosure.
Figure 6:
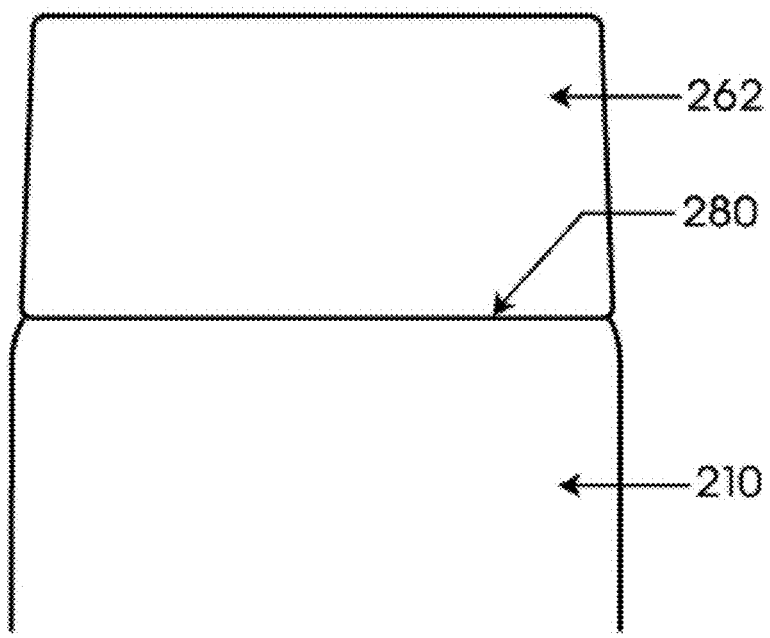
FIG. 6 shows an enlarged view of an inner side of a band portion of a sock in accordance with the present disclosure.

The general sock knitting machine for forming the sock 200 in accordance with the present disclosure as shown in FIG. 3 may include a yarn guide assembly 10 including multiple yarn guides 11 configured to guide a feeding of different types of yarns, a yarn guide adjuster 13, and a yarn guide plate 15. The knitting machine may include a ringshaped sinker control cover 20 coupled to an upper portion of the yarn guide assembly 10 and having a sinker cam disposed therein, wherein the sinker cam may have a certain movement trace. The knitting machine may include a sinker 30 on which the outer yarn is loaded through the yarn guide assembly 10, wherein the sinker 30 may have an engage groove engaged with the sinker cam, and, thus, may rotate in accordance with the movement of the sinker cam. The knitting machine may include a sinker ring 40 having a shape to allow the sinker 30 to be inserted therein, wherein the sinker ring 40 may have multiple slits 41, each slit extending radially. The knitting machine may include the cylinder 50 coupled to a lower portion of the sinker ring 40 to rotate the sinker ring 40. The multiple yarn guides 11 may be arranged side by side, and may have tip ends configured to move upwards or downwards. The left-most yarn guide may be used for the outer yarn. The second and third left yarn guides from the first left-most yarn guide may be used for the inner yarn. The increase of the number of the yarn guides 11 may allow more various colors of the sock to be rendered.

The knitting machine may include multiple knitting needles and sinkers 30. The knitting needles may be about 200. The needles may be configured to move downwards or upwards along an inner vertical face of the cylinder 50. Between the knitting needles, the corresponding number of the sinkers 30 may be disposed in a right angle direction and may be configured to move in a front or rear direction. The yarn may pass through the yarn guide 11 disposed above the knitting needle and sinker 30 and then may be loaded on the sinker 30. The knitting needles arranged along a circumference of the rotating cylinder 50 rotate and, at the same time, move downwards or upwards via the movement of the sinker cam. At this time, one knitting needle may take up the yarn hooked on the sinker 30 and may pull down the yarn. In this way, the knitting of the leg portion 210, instep portion 220, and sole portion 230 may be achieved.

For the formation of the leg portion 210, the knitting needles may remain not to perform knitting for the knitting needles corresponding to a rotation angle range for knitting the instep portion 220 after the heel portion 250, that is, to about one half circumference angle range. In this time, the knitting needles corresponding to a rotation angle range for knitting the heel portion 250, that is, to about one half circumference angle range may perform the knitting (reverse-knitting) while the cylinder 50 is revere-rotated in a shuttling manner per one rotation course. In this way, the heel portion 250 with a thickened portion may be formed.

In this connection, in order to impose a necessary strength to the heel portion 250, a yarn to be knitted for the heel portion 250 may be replaced with a yarn having a good strength. After the knitting of the heel portion 250 using the replaced yarn, the unchanged or original yarn may be back used, and, then, instep portion 220 may be knitted from the leg portion 210, and the sole portion 230 may be knitted from the heel portion 250. The formation of the instep portion 220 and the sole portion 230 may use a forward direction rotation of the cylinder 50. Thereafter, the toe portion 240 may be knitted from the instep portion 220 and the sole portion 230. Then, an open end of the toe portion 240 may be closed, to complete the sock knitting process.

The closing of the open end of the toe portion 240 may be mainly achieved by a connection between the instep portion 220 and toe portion 240. In an alternative, the closing of the open end of the toe portion 240 may be achieved by the connection between the sole portion 230 and toe portion 240. This connection operation may be referred to as a linking operation. A connection line formed by the linking operation may be referred to as a linking line.

One general linking apparatus may include a conveyor unit in association with a driving motor to be configured to move in an endless track way as a pair of chains sandwiching the sock therebetween. The general linking apparatus may further include a cutting unit having a movable blade and a fixed blade to cut the sock during the movement of the sock. The general linking apparatus may further include a pair of sewing units configured to operate via a vertical needle link and a horizontal needle link respectively provided on bodies of the sewing units to sew the cut sock during the movement of the sock.

The linking operation may include a hand linking (a nose linking), an overlock linking, a rosso linking, etc. In the hand linking, a worker manually hooks a loop (nose) into a needle and links two loops to form a linking line. This hand linking result may appear as a knitted structure. Thus, the hand linking may be employed to produce a high grade sock. However, a linking operation between two noses is achieved manually, leading to a very poor productivity. In the overlock linking, a sewing operation is performed using an overlock machine to form a linking line. This may lead to a good productivity. However, the linking line may be very thick to give a poor wearing feel to the wearer. Thus, this method may be applied to a very thick sock or a low grade sock. In the rosso linking, the linking line may be thinner than that in the overlock linking. This may give a good wearing feel to the wearer. Further, this method may have a better productivity than the hand linking.

The conventional sock may have the band portion consisting of the covering yarn, inner yarn and outer yarn. In this connection, the spandex yarn may act as the inner yarn. Thus, the conventional band portion may be formed using the yarn guide including the covering yarn guide, spandex yarn guide, and outer yarn guide in the knitting machine for knitting the leg portion. However, the present leg portion 260 of the sock 200 in accordance with the present disclosure may be formed only using the covering yarn guide in the knitting machine for knitting the leg portion. That is, the present leg portion 260 of the sock 200 in accordance with the present disclosure may be made only of the covering yarn.

The band portion 260 may be formed as follows: only the covering yarn may pass through the covering yarn guide in the knitting machine to form a first knitted loop. While the first loop hooks on the knitting needle, continuous knitting may be performed to form a single cylindrical ring type knitted structure. Then, the single cylindrical ring type knitted structure may be folded at a middle line thereof to form the inner and outer band portions.

The band portion 260 may be formed only of the covering yarn knitted structure. The single cylindrical ring type knitted structure may be folded at a middle line thereof to form the outer portion and inner portion thereof. The top portion of the folded knitted structure may act as an open portion which may first contact the foot when the user wears the sock. The bottom portion of the folded knitted structure, that is, of the band portion 260 may be coupled in an integral manner with the top end of the leg portion 210 via knitting. Thereafter, the covering yarn is cut. Thereafter, when the outer yarn and inner yarn used for the leg portion 210 are fed continuously, the leg portion 210 may be formed via knitting. In this way, the band portion 260 may be coupled in an integrated manner to the leg portion 210.

The band portion 260 may be formed of double layers only made of the covering yarn, leading to a good elasticity. This may prevent the band portion to collapse toward the heel. Since the band portion 260 and leg portion 210 are coupled to each other in an integrated manner via knitting, the connection between the band portion 260 and leg portion 210 may be firm, such that the band portion 260 may not lose the elasticity in spite of a long time use or multiple washings.

Since the first loop of the band portion 260 hooks on the knitting needle, when knitting operation of the band portion 260 in the knitting machine are performed continuously, the ring type on-going created knitted structure of the band portion 260 may be sagged toward the bottom portion of the cylinder 50 by a weight thereof. Since a newly formed knitted portion of the band portion hooks on another knitting needle, a cross-section shape of the on-going knitted structure of the band portion 260 via the continuous knitting may have a 'U' shape. Via further continuous knitting operations, a bottom middle of the resulting knitted structure of the band portion 260 may be further sagged downwards.

The resulting knitted structure of the band portion 260 may look like that a single inner cylindrical knitted structure is surrounded with a single outer cylindrical knitted structure and a bottom of the single inner cylindrical knitted structure is coupled in an integrated manner to a bottom of the single outer cylindrical knitted structure.

The band portion 260 may be formed as follows: only the covering yarn may pass through the covering yarn guide in the knitting machine to form a first knitted loop. While the first loop hooks on the knitting needle, continuous knitting may be performed to form a single cylindrical ring type knitted structure. Then, the single cylindrical ring type knitted structure may be folded at a middle line thereof to form the inner and outer band portions.

The knitting operation of the band portion 260 may be performed as follows: only the covering yarn may pass through the covering yarn guide 11 in the knitting machine to form a first knitted loop only made of the covering yarn. While the first loop hooks on the knitting needle, a next covering yarn may successively pass through the yarn guide 11 and hook on the sinker 30. The knitting needles arranged along a circumference of the rotating cylinder 50 rotate and, at the same time, move downwards or upwards via the movement of the sinker cam. At this time, one knitting needle may take up the covering yarn hooked on the sinker 30 and may pull down the covering yarn.

In a first embodiment of the coupling between the band and leg portions, when the knitted structure of the band portion 260 is completely formed, a last loop of the knitted structure of the band portion 260 hooks on the knitting needle hooking on the first loop of the knitted structure of the band portion 260. That is, the first loop and last loop of the knitted structure of the band portion 260 hook on the same knitting needle. At this state, the outer yarn and inner yarn for knitting the leg portion 210 may pass through respectively an outer yarn guide and an inner yarn guide in the knitting machine. Thereafter, each of first loops of the outer yarn and inner yarn for the leg portion 210 pass through and thus hook on both the first loop and last loop of the knitted structure of the band portion 260 via knitting. Then, the covering yarn is cut. Further, the leg portion 210 may be continuously knitted using the outer yarn and inner yarn for the leg portion 210. In this way, the band portion 260 and leg portion 210 may be coupled in an integrated manner to each other via knitting.

In a second embodiment of the coupling between the band and leg portions, when the knitted structure of the band portion 260 is completely formed, a last loop of the knitted structure of the band portion 260 hooks on the knitting needle hooking on the first loop of the knitted structure of the band portion 260. That is, the first loop and last loop of the knitted structure of the band portion 260 hook on the same knitting needle. At this state, the outer yarn and inner yarn for knitting the leg portion 210 may pass through respectively an outer yarn guide and an inner yarn guide in the knitting machine. Thereafter, the outer yarn for the leg portion 210 passes through and thus hooks on the first loop of the knitted structure of the band portion 260 via knitting. At the same time, the inner yarn for the leg portion 210 passes through and thus hooks on the last loop of the knitted structure of the band portion 260 via knitting. Then, the covering yarn is cut. Further, the leg portion 210 may be continuously knitted using the outer yarn and inner yarn for the leg portion 210. In this way, the band portion 260 and leg portion 210 may be coupled in an integrated manner to each other via knitting.

As in the first embodiment of the coupling between the band and leg portions, both the first loop and last loop of the band portion 260 are knitted with the outer yarn and inner yarn for the leg portion 210 at the same time. That is, both the first loop and last loop of the band portion 260 hook on each of the first loops of the outer yarn and inner yarn for the leg portion 210. In this way, the first loop and last loop of the band portion 260 may be more firmly coupled to the first loops of the outer yarn and inner yarn of the leg portion 210 via knitting.

As in the second embodiment of the coupling between the band and leg portions, the first loop of the band portion 260 is knitted with the outer yarn of the leg portion 210, and, at the same time, the last loop of the band portion 260 is knitted with the inner yarn of the leg portion 210. That is, the first loop of the band portion 260 is coupled in an integrated manner to the first loop of the outer yarn of the leg portion 210 via knitting, and, at the same time, the last loop of the band portion 260 is coupled to in an integrated manner to the first loop of the inner yarn of the leg portion 210 via knitting. Thus, the band and leg portions may be firmly coupled to each other via knitting.

Figure 7:
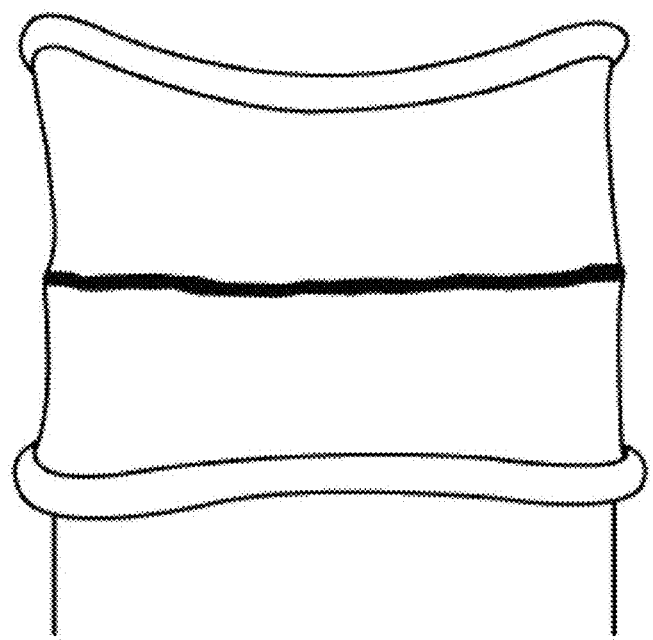
FIG. 7 shows an inner side of a band portion of a sock in accordance with the present disclosure.

FIG. 7 shows an inner side of the band portion of the present sock, wherein the band portion and leg portion are coupled to each other via knitting. Here, a first loop of an outer yarn of the leg portion hooks on a first loop of band portion, and a first loop of an inner yarn of the leg portion hooks on a last loop of band portion, and, then, the outer yarn and inner yarn of the leg portion are knitted at the same time to form the leg portion.

That is, the first loop and last loop of the band portion 260 are separated from each other, and the first loops of the outer yarn and inner yarn of the leg portion 210 are separated from each other. The outer yarn and inner yarn may be knitted in an integrated manner with each other from a point where the outer yarn and inner yarn of the leg portion 210 form the loops at the same time.

When, as in the first embodiment of the coupling between the band and leg portions, both the first loop and last loop of the band portion 260 are knitted with the outer yarn and inner yarn for the leg portion 210 at the same time, an outer connection line 270 between the leg and band portions is formed on an outer portion of the sock, and an inner connection line 280 between the leg and band portions is formed on an outer portion of the sock. As in the second embodiment of the coupling between the band and leg portions, the first loop of the band portion 260 is knitted with a first loop of the outer yarn of the leg portion 210 such that an outer connection line 270 between the leg and band portions is formed on an outer portion of the sock, and, at the same time, the last loop of the band portion 260 is knitted with a first loop of the inner yarn of the leg portion 210 such that an inner connection line 280 between the leg and band portions is formed on an inner portion of the sock.

Each of the outer connection line 270 and inner connection line 280 may appear as distinguished by the different yarn types of the band portion 260 and leg portion 210, that is, as distinguished by the covering yarn of the band portion 260 and the general yarn of the leg portion 210. In alternative, each of the outer connection line 270 and inner connection line 280 may appear as distinguished by the different pattern types of the band portion 260 and leg portion 210.

In the present disclosure, the band portion 260 may not be loaded on the top plate of the knitting machine, which is not the case for the conventional sock production process, and, further, the band portion 260 and leg portion 210 may be coupled in an integrated manner to each other via knitting. This may lead to a reduction of the sock production steps, and, thus, improved productivity. Further, the sock production process may be less interrupted by 33% to 50% than in the conventional sock production process.

The inner and outer portions of the band portion are knitted identically or differently. Specifically, the entire band portion 260 may be formed of a cylindrical knitted structure with the same pattern, and, then, the cylindrical knitted structure may be folded at the middle line thereof inwardly, such that the outer portion 261 and inner portion 262 may have the same pattern. Otherwise, the band portion 260 may be formed of a cylindrical knitted structure such that half upper and lower portions thereof may have different patterns. Then, the cylindrical knitted structure may be folded at the middle line thereof inwardly, such that the outer portion 261 and inner portion 262 may have the different patterns.

When that the outer portion 261 and inner portion 262 may have the different patterns, a boundary between the outer portion 261 and inner portion 262 may act as a top-most portion of the sock from which the foot of the wearer is inserted in the sock.

In one example, the entire band portion 260 may have the same pattern, such as a rib pattern (stripe embossing pattern), a links pattern (a combination of embossing and geometrical forms), a plain pattern, etc. In one example, when that the outer portion 261 and inner portion 262 may have the different patterns, for example, the outer portion 261 of the band portion 260 may have a rib pattern (stripe embossing pattern) whereas the inner portion 262 thereof may have a links pattern (a combination of embossing and geometrical forms) or a plain pattern.

Moreover, the outer layer of the band portion 260 may be formed of two different patterns. An upper half portion of the outer portion 261 of the band portion 260 may have a rib pattern (stripe embossing pattern) whereas a lower half portion of the outer portion 262 thereof may have a links pattern (a combination of embossing and geometrical forms) or a plain pattern; or vice versa. This may be achieved under control by a computer. This patterning process may be conventional, and, thus, details about the process are omitted herein.

The covering yarn of the band portion 260 may have a rubber yarn as a core yarn, and a twisted yarn as an outer yarn twisted on and along the core yarn. The twisted yarn may include one selected from spandex yarn, polyester yarn, nylon yarn, acrylic yarn, rayon yarn, polypropylene yarn, polyester yarn, polyethylene yarn, PVA yarn, polyvinyl chloride yarn, polyvinylidene chloride yarn and aramid yarn. The twisted yarn may extend in a coil spring shape. The twisted yarn may have a length larger 2 to 3 times than that of the core yarn.

The rubber yarn of the covering yarn may have a good restoring force and stretchability. When the rubber yarn as the core yarn stretches, the twisted yarn relaxes and thus stretches, to increase the total length thereof. When a restoring force of the rubber yarn works, the twisted yarn compresses to an original state.

The spandex yarn may have a main component (above 85% content) made of a polyurethane, thus to have a good disruptive strength, elasticity and the like. The polyester yarn may be obtained by a polycondensation reaction between a polybasic acid and a polyhydric alcohol, and may have a good chemical-resistance. The nylon yarn may include an aliphatic polyamide having amide bonds (—NHCO—), and, thus, may have a high strength and may be lightweight may have a friction or bending resistance. The acrylic yarn may have acrylic nitrile units as a main component thereof and may be made by copolymerization of vinyl chloride or vinyl acetate may have excellent dyeability. The rayon yarn may be made using a polymer found in a cellulose, and may have good absorption and emission of sweat. The polypropylene yarn may be made by addition polymerization of propylene and may be lightweight, and have a good strength, but a poor dyeing properties and heat resistance. The polyester yarn may be created by condensation polymerization of DMT (dimethyltelephthalimide) as dimethylester or TA (telephthal acid), and may have good heat-resistance, and an excellent thermoplasticity. The polyethylene yarn may be made of addition polymerization of ethylene, and may be lightweight but have a poor heat resistance. The polyvinyl alcohol (PVA) yarn may be made by radical polymerization of vinyl acetate and synthesis thereof with polyvinyl acetate and saponification thereof with alkali and may have good sweat absorption. The PVC (polyvinyl chloride) yarn may be made by polymerization of vinyl chloride and, wherein the vinyl chloride may be made by ethylene chlorination to form dichloroethane which is subjected to pyrolysis, and the PVC yarn may have good water-resistance, chemical-resistance, corrosive-resistance, non-flammability, and very low softening point. The polyvinylidene chloride yarn may be made by forming vinylidene chloride using vinyl chloride as raw material, and radical polymerization of the vinylidene chloride, and the polyvinylidene chloride yarn have clearness and good fastness. The aramid yarn may be an aromatic polyamide based fiber which is made by polycondensation of aromatic diamine and aromatic dibasic acid chloride, and may have good tensile strength, toughness, heat resistance, and excellent elasticity.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A sock comprising a leg portion, heel portion, instep portion, sole portion, toe portion, and, an elastic band portion coupled to the leg portion, wherein a combination of the leg portion, heel portion, instep portion, sole portion, and toe portion forms a knitted structure,
wherein the band portion is knitted using only a covering yarn forming a tubular knitted structure, wherein a bottom of the band portion is coupled in an integrated manner to a top of the leg portion via knitting, wherein the band portion is substantially folded in half having inner and outer surfaces after the tubular knitted structure is formed,
wherein the band and leg portions are knitted with each other such that each of first loops of outer and inner yarns of the leg portion passes through and hooks on both of first and last loops of the band portion, and, thereafter, the covering yarn is cut, and, then, the leg portion is continuously knitted using the outer and inner yarns thereof.

2. A sock comprising a leg portion, heel portion, instep portion, sole portion, toe portion, and, an elastic band portion coupled to the leg portion, wherein a combination of the leg portion, heel portion, instep portion, sole portion, and toe portion forms a knitted structure,
wherein the band portion is knitted using only a covering yarn forming a tubular knitted structure, wherein a bottom of the band portion is coupled in an integrated manner to a top of the leg portion via knitting, wherein the band portion is substantially folded in half having inner and outer surfaces after the tubular knitted structure is formed,
wherein the band and leg portions are knitted with each other such that a first loop of an outer yarn of the leg portion passes through and hooks on a first loop of the band portion, and, at the same time, a first loop of an inner yarn of the leg portion passes through and hooks on a last loop of the band portion, and, thereafter, the covering yarn is cut, and, then, the leg portion is continuously knitted using the outer and inner yarns thereof.

3. The sock of claim 1, wherein the covering yarn of the band portion includes a rubber yarn as a core yarn, and a twisted outer yarn twisted on and along an outer face of the core yarn, wherein the twisted outer yarn includes one selected from a group consisting of a spandex yarn, polyester yarn, nylon yarn, acrylic yarn, rayon yarn, polypropylene yarn, polyester yarn, polyethylene yarn, polyvinyl alcohol yarn, polyvinyl chloride yarn, polyvinylidene chloride yarn, and aramid yarn.

4. The sock of claim 3, wherein the inner and outer portions of the band portion are knitted identically or differently.

5. The sock of claim 2, wherein the covering yarn of the band portion includes a rubber yarn as a core yarn, and a twisted outer yarn twisted on and along an outer face of the core yarn, wherein the twisted outer yarn includes one selected from a group consisting of a spandex yarn, polyester yarn, nylon yarn, acrylic yarn, rayon yarn, polypropylene yarn, polyester yarn, polyethylene yarn, polyvinyl alcohol yarn, polyvinyl chloride yarn, polyvinylidene chloride yarn, and aramid yarn.

6. The sock of claim 5, wherein the inner and outer portions of the band portion are knitted identically or differently.

* * * * *